United States Patent [19]
Hammarlund et al.

[11] Patent Number: 6,105,111
[45] Date of Patent: Aug. 15, 2000

[54] METHOD AND APPARATUS FOR PROVIDING A CACHE MANAGEMENT TECHNIQUE

[75] Inventors: Per H. Hammarlund, Hillsboro; Glenn J. Hinton, Portland, both of Oreg.

[73] Assignee: Intel Corporation, Santa Clara, Calif.

[21] Appl. No.: 09/053,527

[22] Filed: Mar. 31, 1998

[51] Int. Cl.⁷ .................................................... G06F 12/00
[52] U.S. Cl. .......................................... 711/136; 711/128
[58] Field of Search ..................................... 711/128, 136

[56] References Cited

U.S. PATENT DOCUMENTS

| | | | |
|---|---|---|---|
| 5,493,667 | 2/1996 | Huck et al. ............................. | 711/125 |
| 5,737,565 | 4/1998 | Mayfield ................................. | 711/213 |

Primary Examiner—Jack A. Lane
Attorney, Agent, or Firm—Blakely, Sokoloff, Taylor & Zafman LLP

[57] ABSTRACT

A cache technique for maximizing cache efficiency by assigning ages to elements which access the cache, is described. In one embodiment, the cache technique includes receiving a first element of a first type by a cache and writing the first element in a set of the cache. The first element has a first age. The cache technique further includes receiving a second element of a second type by the cache and writing the second element in the set of the cache. The second element has a middle age, where the first age is a more recently used age than the middle age. In another embodiment, the cache technique includes receiving a first element of a first stream by a cache and writing the first element in a set of the cache. The first element has a first age. The cache technique further includes receiving a second element of a second stream by the cache and writing the second element in the set of the cache. The second element has a middle age, where the first age is a more recently used age than the middle age.

20 Claims, 5 Drawing Sheets

| Time | Access | Age 0 | Age 1 | Age 2 | Age 3 | Age 4 | Age 5 | Age 6 | Age 7 | Action |
|---|---|---|---|---|---|---|---|---|---|---|
| 0 | A1 Miss | A1 | | | | | | | | |
| 1 | B1 Miss | A1 | | | | B1 | | | | |
| 2 | A5 Miss | A5 | A1 | | | | B1 | | | |
| 3 | B5 Miss | A5 | A1 | | | B5 | | B1 | | |
| 4 | A4 Miss | A4 | A5 | A1 | | | B5 | | B1 | |
| 5 | B4 Miss | A4 | A5 | A1 | | B4 | | B5 | | B1 Evicted |
| 6 | A6 Miss | A6 | A4 | A5 | A1 | | B4 | | B5 | |
| 7 | B6 Miss | A6 | A4 | A5 | A1 | B6 | | B4 | | B5 Evicted |
| 8 | A4 Hit | A4 | A6 | A5 | A1 | B6 | | B4 | | |
| 9 | B4 Hit | A4 | A6 | A5 | A1 | B4 | B6 | | | |
| 10 | A7 Miss | A7 | A4 | A6 | A5 | A1 | B4 | B6 | | |
| 11 | B7 Miss | A7 | A4 | A6 | A5 | B7 | A1 | B4 | B6 | |
| 12 | A6 Hit | A6 | A7 | A4 | A5 | B7 | A1 | B4 | B6 | |
| 13 | B6 Hit | A6 | A7 | A4 | A5 | B6 | B7 | A1 | B4 | |
| 14 | A1 Hit | A1 | A6 | A7 | A4 | A5 | B6 | B7 | B4 | |
| 15 | B1 Miss | A1 | A6 | A7 | A4 | B1 | A5 | B6 | B7 | B4 Evicted |
| 16 | A3 Miss | A3 | A1 | A6 | A7 | A4 | B1 | A5 | B6 | B7 Evicted |
| 17 | B3 Miss | A3 | A1 | A6 | A7 | B3 | A4 | B1 | A5 | B6 Evicted |
| 18 | A4 Hit | A4 | A3 | A1 | A6 | A7 | B3 | B1 | A5 | |
| 19 | B4 Miss | A4 | A3 | A1 | A6 | B4 | A7 | B3 | B1 | A5 Evicted |
| 20 | A1 Hit | A1 | A4 | A3 | A6 | B4 | A7 | B3 | B1 | |
| 21 | B1 Hit | A1 | A4 | A3 | A6 | B1 | B4 | A7 | B3 | |

|  | Control bits |  | (52) Way 0 | (54) Way 1 | (56) Way 2 | (58) Way 3 | (60) Way 4 | (62) Way 5 | (64) Way 6 | (66) Way 7 |
|---|---|---|---|---|---|---|---|---|---|---|
| Set 0 |  |  |  |  |  |  |  |  |  |  |
|  |  |  |  |  |  |  |  |  |  |  |
| . . . . . |  |  |  |  |  |  |  |  |  |  |
| Set n |  |  |  |  |  |  |  |  |  |  |

| Time | Access   | Age 0 | Age 1 | Age 2 | Age 3 | Age 4 | Age 5 | Age 6 | Age 7 | Action      |
|------|----------|-------|-------|-------|-------|-------|-------|-------|-------|-------------|
| 0    | A1 Miss  | A1    |       |       |       |       |       |       |       |             |
| 1    | B1 Miss  | A1    |       |       |       | B1    |       |       |       |             |
| 2    | A5 Miss  | A5    | A1    |       |       |       | B1    |       |       |             |
| 3    | B5 Miss  | A5    | A1    |       |       | B5    |       | B1    |       |             |
| 4    | A4 Miss  | A4    | A5    | A1    |       |       | B5    |       | B1    |             |
| 5    | B4 Miss  | A4    | A5    | A1    |       | B4    |       | B5    |       | B1 Evicted  |
| 6    | A6 Miss  | A6    | A4    | A5    | A1    |       | B4    |       | B5    |             |
| 7    | B6 Miss  | A6    | A4    | A5    | A1    | B6    |       | B4    |       | B5 Evicted  |
| 8    | A4 Hit   | A4    | A6    | A5    | A1    | B6    |       | B4    |       |             |
| 9    | B4 Hit   | A4    | A6    | A5    | A1    | B4    | B6    |       |       |             |
| 10   | A7 Miss  | A7    | A4    | A6    | A5    | A1    | B4    | B6    |       |             |
| 11   | B7 Miss  | A7    | A4    | A6    | A5    | B7    | A1    | B4    | B6    |             |
| 12   | A6 Hit   | A6    | A7    | A4    | A5    | B7    | A1    | B4    | B6    |             |
| 13   | B6 Hit   | A6    | A7    | A4    | A5    | B6    | B7    | A1    | B4    |             |
| 14   | A1 Hit   | A1    | A6    | A7    | A4    | A5    | B6    | B7    | B4    |             |
| 15   | B1 Miss  | A1    | A6    | A7    | A4    | B1    | A5    | B6    | B7    | B4 Evicted  |
| 16   | A3 Miss  | A3    | A1    | A6    | A7    | A4    | B1    | A5    | B6    | B7 Evicted  |
| 17   | B3 Miss  | A3    | A1    | A6    | A7    | B3    | A4    | B1    | A5    | B6 Evicted  |
| 18   | A4 Hit   | A4    | A3    | A1    | A6    | A7    | B3    | B1    | A5    |             |
| 19   | B4 Miss  | A4    | A3    | A1    | A6    | B4    | A7    | B3    | B1    | A5 Evicted  |
| 20   | A1 Hit   | A1    | A4    | A3    | A6    | B4    | A7    | B3    | B1    |             |
| 21   | B1 Hit   | A1    | A4    | A3    | A6    | B1    | B4    | A7    | B3    |             |

FIGURE 4

| Time | Access | Age 0 | Age 1 | Age 2 | Age 3 | Age 4 | Age 5 | Age 6 | Age 7 | Action |
|---|---|---|---|---|---|---|---|---|---|---|
| 0 | 1 Miss | 1 | | | | | | | | |
| 1 | 2 Miss | 2 | 1 | | | | | | | |
| 2 | 6 Miss | 6 | 2 | 1 | | | | | | |
| 3 | A Miss | 6 | 2 | 1 | | A | | | | |
| 4 | 2 Hit | 2 | 6 | 1 | | A | | | | |
| 5 | 5 Miss | 5 | 2 | 6 | 1 | | A | | | |
| 6 | B Miss | 5 | 2 | 6 | 1 | B | | A | | |
| 7 | 3 Miss | 3 | 5 | 2 | 6 | 1 | B | | A | |
| 8 | C Miss | 3 | 5 | 2 | 6 | C | 1 | B | | A Evicted |
| 9 | 4 Miss | 4 | 3 | 5 | 2 | 6 | C | 1 | B | |
| 10 | D Miss | 4 | 3 | 5 | 2 | D | 6 | C | 1 | B Evicted |
| 11 | 6 Hit | 6 | 4 | 3 | 5 | 2 | D | C | 1 | |
| 12 | E Miss | 6 | 4 | 3 | 5 | E | 2 | D | C | 1 Evicted |
| 13 | 2 Hit | 2 | 6 | 4 | 3 | 5 | E | D | C | |
| 14 | 4 Hit | 4 | 2 | 6 | 3 | 5 | E | D | C | |
| 15 | F Miss | 4 | 2 | 6 | 3 | F | 5 | E | D | C Evicted |
| 16 | 5 Hit | 5 | 4 | 2 | 6 | 3 | F | E | D | |
| 17 | 4 Hit | 4 | 5 | 2 | 6 | 3 | F | E | D | |

FIGURE 5

METHOD AND APPARATUS FOR PROVIDING A CACHE MANAGEMENT TECHNIQUE

BACKGROUND OF THE INVENTION

1. Field of the Invention

The present invention relates in general to the field of processors, and in particular, to a method and apparatus for providing a cache management technique.

2. Description of the Related Art

The use of a cache memory with a processor facilitates the reduction of memory access time. The fundamental idea of cache organization is that by keeping the most frequently accessed instructions and data in the fast cache memory, the average memory access time will approach the access time of the cache. To achieve the maximum possible speed of operation, typical processors implement a cache hierarchy, that is, different levels of cache memory. The different levels of cache correspond to different distances from the processor core. The closer the cache is to the processor, the faster the data access. However, the faster the data access, the more costly it is to store data. As a result, the closer the cache level, the faster and smaller the cache.

The performance of cache memory is frequently measured in terms of its hit ratio. When the processor refers to memory and finds the word in cache, it is said to produce a hit. If the word is not found in cache, then it is in main memory and it counts as a miss. If a miss occurs, then an allocation is made at the entry indexed by the access. The access can be for loading data to the processor or storing data from the processor to memory. The cached information is retained by the cache memory until it is no longer needed, made invalid or replaced by other data, in which instances the cache entry is de-allocated.

The type of data that is typically stored in cache includes active portions of programs and data. When the cache is full, it is necessary to replace existing lines of stored data in the cache memory to make room for newly requested lines of data. One such replacement technique involves the use of the least recently used (LRU) algorithm, which replaces the least recently used line of data with the newly requested line.

In cache memories that are organized using a set associative architecture, the LRU algorithm is used to maintain a list of the age of each way on a per set basis. The ages typically range from the most recently used to the least recently used. When a new element is written into a selected way, the age of the way is updated to indicate that it is the most recently used. In addition, when there is a cache hit, the age of the way that was hit also is updated to indicate that it is the most recently used. In applying the LRU algorithm, the data that is new or used repeatedly is frequently updated, so that its age is furthest from the least recently used data. As a result, frequently used data is unlikely to be evicted. However, if a new element is used once or infrequently, it will remain in the cache until it is the least recently used element. During this time, many reusable entries may have been evicted even if it would have been better to evict the infrequently used element. Since the infrequently used element will not be used again, it is truly the most eligible target for eviction.

For example, assume a cache set with two ways, one with data A and another with data B. Assume further that data A, data B, and data C target the same cache set and a program that reads and writes data A and data B multiple times. In the middle of the reads and writes of data A and data B, if the program performs an access of non-reusable data C, the cache will have to evict, for example, data A from way one and replace it with data C. If the program then tries to access data A again, a cache "miss" occurs, in which case data A is retrieved from external memory and data B is evicted from way two and replaced with data A. If the program then tries to access data B again, another cache "miss" occurs, in which case data B is retrieved from external memory and data C is evicted from way one and replaced with data B. Since data C is non-reusable by the program, this procedure wastes a considerable amount of clock cycles, decreases efficiency, and pollutes the cache.

Accordingly, there is a need in the technology for providing a cache management technique.

BRIEF SUMMARY OF THE INVENTION

In one embodiment, the present invention is a cache technique for maximizing cache efficiency by assigning ages to elements which access the cache. The cache technique includes receiving a first element of a first type by a cache and writing the first element in a set of the cache. The first element has a first age. The cache technique further includes receiving a second element of a second type by the cache and writing the second element in the set of the cache. The second element has a middle age, where the first age is a more recently used age than the middle age.

BRIEF DESCRIPTION OF THE DRAWINGS

The invention is illustrated by way of example, and not limitation, in the figures. Like reference indicate similar elements.

FIG. 3 is a block diagram illustrating an exemplary embodiment of the organizational structure of the cache memory in which an exemplary technique of the present invention is implemented.

FIG. 4 is a table illustrating an exemplary cache management technique in accordance with the principles of the present invention.

FIG. 5 is a table illustrating an second exemplary cache management technique in accordance with the principles of the present invention.

DETAILED DESCRIPTION OF THE INVENTION

In one embodiment of the present invention, a technique is described for providing management of cache memories, in which access to a shared cache or cache-like structure by at least two different execution streams is performed by assigning priority to one execution stream over another without altering either execution stream. In another embodiment, a cache management technique is described, in which access to a cache or cache-like structure by a single execution stream having more than one data and/or instruction types (or elements) is performed by assigning priority to one data and/or instruction type over another.

In the following description, numerous specific details are set forth, such as specific memory devices, circuit diagrams, processor instructions, etc., in order to provide a thorough understanding of the present invention. However, it will be appreciated by one skilled in the art that the present invention may be practiced without these specific details. In other instances, well known techniques and structures have not been described in detail in order not to obscure the present invention. It is to be noted that a particular implementation is described as a preferred embodiment of the present invention, however, it is readily understood that other embodiments can be designed and implemented without departing from the spirit and scope of the present invention. Furthermore, it is appreciated that the present invention is described in reference to a serially arranged cache hierarchy system, but it need not be limited strictly to such a hierarchy.

As hereinafter described, non-temporal data refers to data that is intended to be used once or at most a limited number of times (e.g. two or three times) by the processor whereas temporal data is data that is intended to be used more than non-temporal data (i.e., used repeatedly). A line of data refers to thirty-two bytes of data, as presently utilized in microprocessor-based systems, although it is within the scope of the present invention if a line of data refers to more or less bytes of data. A cache "hit" occurs when the address of an incoming instruction matches one of the valid entries. For example, in the MESI protocol, a line in the cache has a valid entry when it is in modified "M", exclusive "E", or shared "S" state. A cache "miss" occurs when the address of an incoming instruction does not match any entries in the cache.

Figure 1:
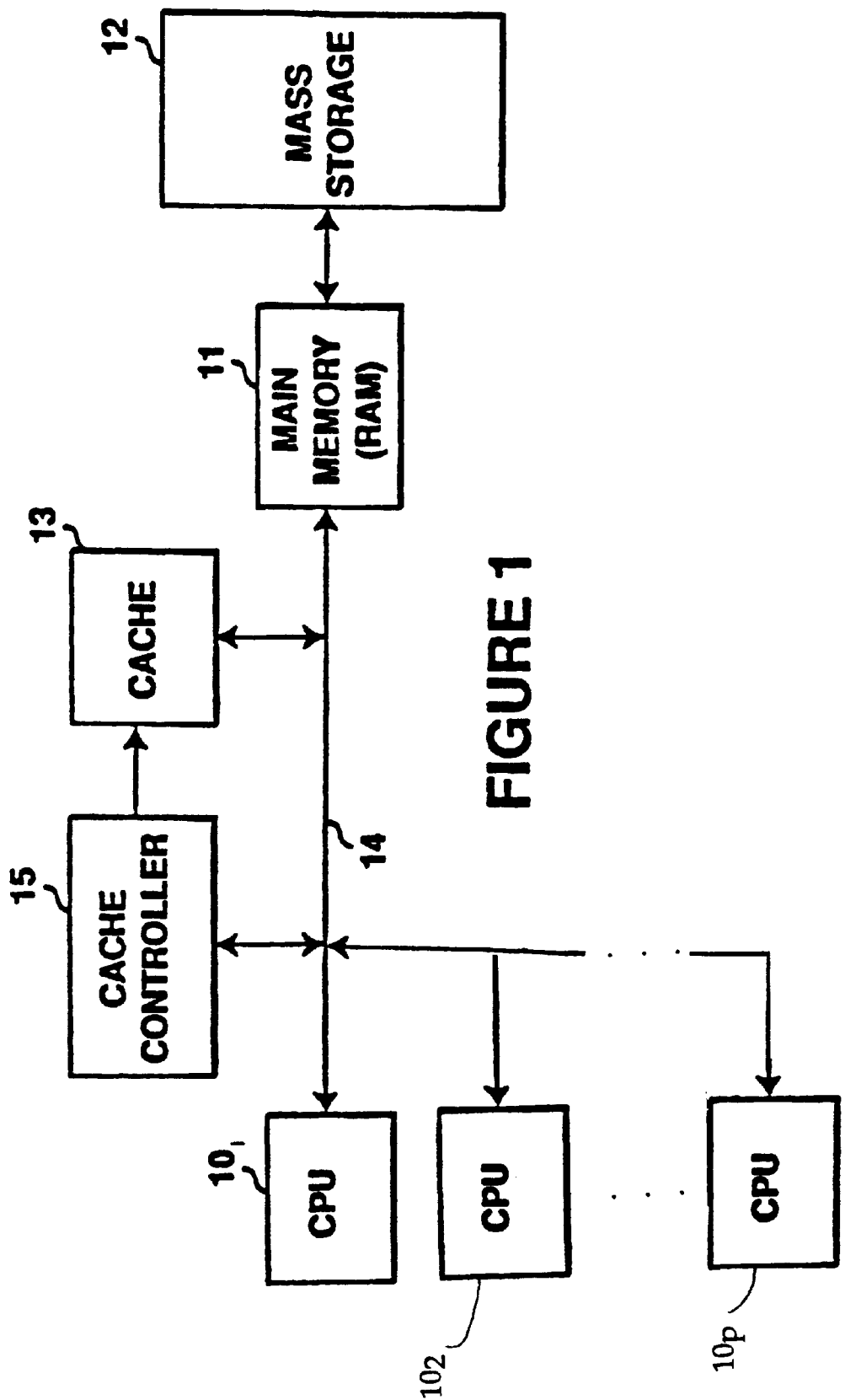
FIG. 1 is a circuit block diagram illustrating an exemplary embodiment of a computer system which implements the present invention, in which a cache memory is used for data accesses between a main memory and a processor of the computer system.

Referring to FIG. 1, a typical computer system is shown, wherein a processor 10, which forms the central processing unit (CPU) of the computer system is coupled to a main memory 11 by a bus 14. The main memory 11 is typically comprised of a random-access-memory and is usually referred to as RAM. Subsequently, the main memory 11 is generally coupled to a mass storage device 12, such as a magnetic or optical memory device, for mass storage (or saving) of information. A cache memory 13 (hereinafter also referred simply as cache) is coupled to the bus 14 as well. The cache 13 is shown located between the CPU 10 and the main memory 11, in order to exemplify the functional utilization and transfer of data associated with the cache 13. It is appreciated that the actual physical placement of the cache 13 can vary depending on the system and the processor architecture. Furthermore, a cache controller 15 is shown coupled to the cache 13 and the bus 14 for controlling the operation of the cache 13. The operation of a cache controller, such as the controller 15, is known in the art and, accordingly, in the subsequent Figures, cache controllers are not illustrated. It is presumed that some controller(s) is/are present under control of the CPU 10 to control the operation of cache(s) shown.

In a multiprocessor system (e.g., two or more processors), additional processors (CPUs) $10_2$–$10_P$ (where P is a positive whole number greater than one) are coupled to the bus 14. Each additional CPU $10_2$–$10_P$ shares the cache 13 and main memory 11 for writing data and/or instructions to and reading data and/or instructions from the same. Each CPU may support multiple streams of execution (e.g., a multi-threaded processor) in that each is capable of handling multiple contexts (or processes) concurrently or simultaneously. In an alternative embodiment, each CPU may support multiple processes on a context-switched basis.

In operation, information transfer between the memory 11 and the CPU 10 is achieved by memory accesses from the CPU 10. When data is currently or shortly to be accessed by the CPU 10, that data is first allocated in the cache 13. That is, when the CPU 10 accesses a given information from the memory 11, it seeks the information from the cache 13. If the accessed data is in the cache 13, a "hit" occurs. Otherwise, a "miss" results and cache allocation for the data is sought. As currently practiced, most accesses (whether load or store) require the allocation of the cache 13. Only uncacheable access are not allocated in the cache.

Figure 2:
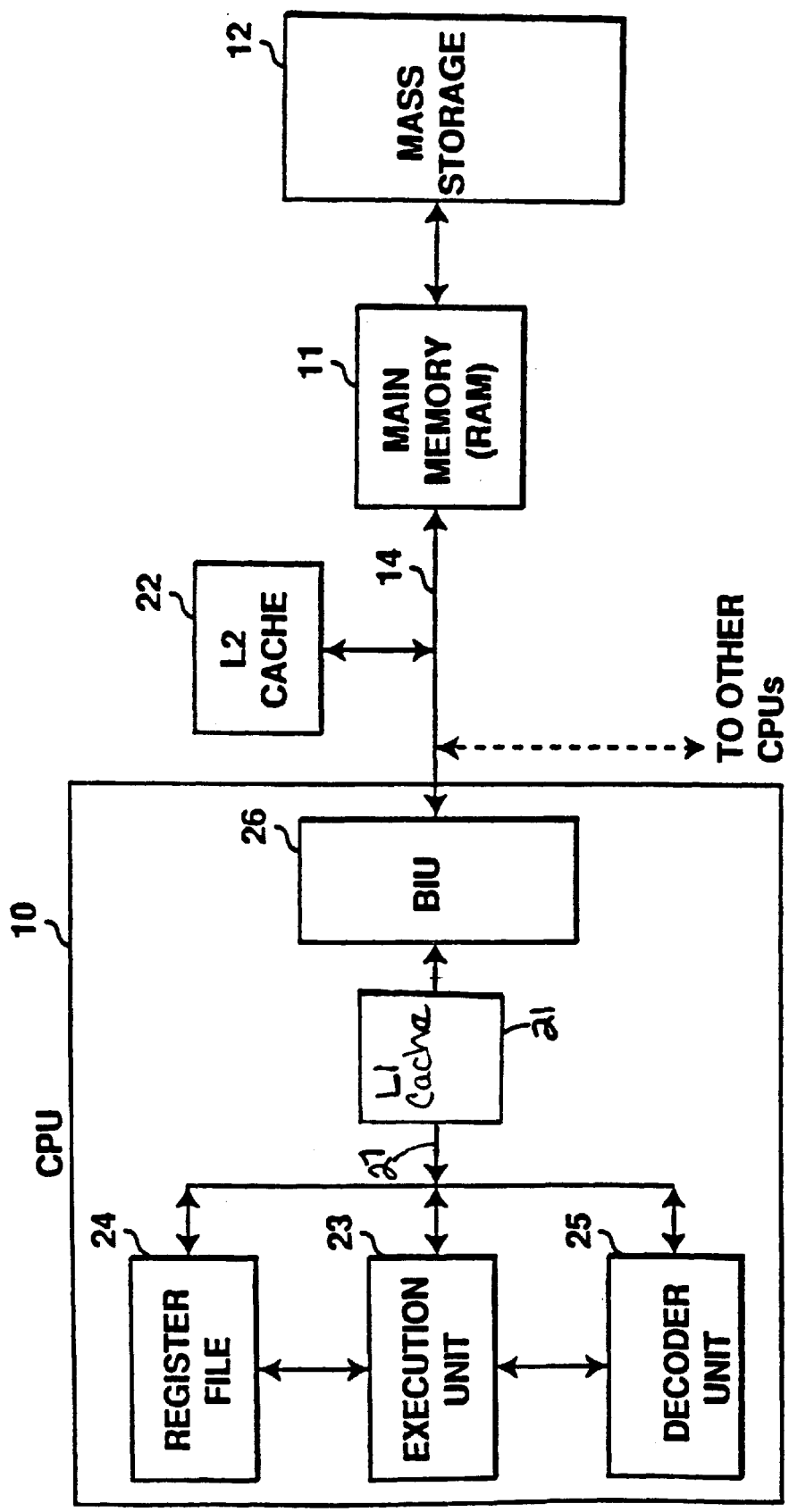
FIG. 2 is a circuit block diagram illustrating a second exemplary embodiment of a computer system which implements the present invention, in which two cache memories are arranged into cache memory levels for accessing data between a main memory and a processor(s) of the computer system.

Referring to FIG. 2, a computer system implementing a multiple cache arrangement is shown. The CPU 10 is still coupled to the main memory 11 by the bus 14 and the memory 11 is then coupled to the mass storage device 12. However, in the example of FIG. 2, two separate cache memories 21 and 22 are shown. The caches 21–22 are shown arranged serially and each is representative of a cache level, referred to as Level 1 (L1) cache and Level 2 (L2) cache, respectively. Furthermore, the L1 cache 21 is shown as part of the CPU 10, while the L2 cache 22 is shown external to the CPU 10. This structure exemplifies the current practice of placing the L1 cache on the processor chip while higher level caches are placed external to it. The actual placement of the various cache memories is a design choice or dictated by the processor architecture. Thus, it is appreciated that the L1 cache could be placed external to the CPU 10. In another embodiment, the CPU 10 may contain any number of levels of cache.

Generally, CPU 10 includes an execution unit 23, register file 24 and fetch/decoder unit 25. The execution unit 23 is the processing core of the CPU 10 for executing the various arithmetic (or non-memory) processor instructions. The register file 24 is a set of general purpose registers for storing (or saving) various information required by the execution unit 23. There may be more than one register file in more advanced systems. The fetch/decoder unit 25 fetches instructions from a storage location (such as the main memory 11) holding the instructions of a program that will be executed and decodes these instructions for execution by the execution unit 23. In more advanced processors utilizing pipelined architecture, future instructions are prefetched and decoded before the instructions are actually needed so that the processor is not idle waiting for the instructions to be fetched when needed.

The various units 23–25 of the CPU 10 are coupled to an internal bus structure 27. A bus interface unit (BIU) 26 provides an interface for coupling the various units of CPU 10 to the bus 14. As shown in FIG. 2, the L1 cache is coupled to the internal bus 27 and functions as an internal cache for the CPU 10. However, again it is to be emphasized that the L1 cache could reside outside of the CPU 10 and coupled to the bus 14. The caches can be used to cache data, instructions or both. In some systems, the L1 cache is actually split into two sections, one section for caching data and one section for caching instructions. However, for simplicity of explanation, the various caches described in the Figures are shown as single caches with data, instructions and other information all referenced herein as data. It is appreciated that the operations of the units shown in FIG. 2 are known. Furthermore it is appreciated that the CPU 10 actually includes many more components than just the components shown. Thus, only those structures pertinent to the understanding of the present invention are shown in FIG. 2. In one embodiment, the invention is utilized in data caches. However, the invention is applicable to any type of cache.

It is also to be noted that the computer system may be comprised of more than one CPU as shown in FIG. 1 and by the dotted line in FIG. 2. In such a system, it is typical for multiple CPUs to share the main memory 11 and/or mass storage unit 12. Accordingly, some or all of the caches associated with the computer system may be shared by the various processors of the computer system. For example, with the system of FIG. 2, L1 cache 21 of each processor would be utilized by its processor only, but the main memory 11 and the L2 cache 22 would be shared by some or all of the CPUs of the system. Alternatively, each CPU has its own associated external L2 cache 22. The present invention can be practiced in a single CPU computer system or in a multiple CPU computer system. It is further noted that other types of units (other than processors) which access memory can function equivalently to the CPUs described herein and, therefore, are capable of performing the memory accessing functions similar to the described CPUs. For example, direct memory accessing (DMA) devices can readily access memory similar to the processors described herein. Thus, a computer system having one processor (CPU), but one or more of the memory accessing units would function equivalent to the multiple processor system shown described herein.

As noted, only two caches 21–22 are shown. However, the compute system need not be limited to only two levels of cache. It is now a practice to utilize a third level (L3) cache in more advanced systems. It is also the practice to have a serial arrangement of cache memories so that data cached in the L1 cache is also cached in the L2 cache. If there happens to be an L3 cache, then data cached in the L2 cache is typically cached in the L3 cache as well. Thus, data cached at a particular cache level is also cached at all higher levels of the cache hierarchy.

Different access streams have different reusability of data. In one embodiment, the present invention prioritizes access streams to achieve higher performance. In another embodiment, the present invention prioritizes one type of data and/or instruction over another in a single access stream. These embodiments, utilize techniques in such a way as to maintain the most reusable data in the cache. This method can be implemented a number of ways including, but not limited or restricted to, explicit programmer inserted hints in the instruction, dedicated hardware that tracks past performance of the re-usability of an item in cache, or a fixed control register set scheme controlled by either the operating system or an application program.

In one embodiment, the present invention allows multiple access streams with different cache characteristics (e.g., reusability) to share a cache or cache-like structure. Different access streams includes, but not limited or restricted to, access to temporal or non-temporal data/instructions, multiple access streams by the same processor, access to data or instructions, and access by different types of instructions (e.g., prefetch). The present invention adaptively selects an age such that the most reusable data or instructions that have a higher likelihood of remaining in the cache.

FIG. 3 is a block diagram illustrating an exemplary embodiment of the organizational structure of the cache memory in which an exemplary technique of the present invention is implemented. In general, there are "x" sets in a cache structure, "y" ways per set (where y≧2), and where each way contains one data entry or one cache line. There are also "z" control bits per set. The number of control bits per set varies depending on several factors including, but not limited to, the number of ways per set, the LRU technique, and the insertion and eviction technique implemented.

In the embodiment as shown, the cache 50 is organized as an eight-way set associative cache. In particular, the cache 50 is divided into eight ways (for example, way 0 (52), way 1 (54), way 2 (56), way 3 (58), way 4 (60), way 5 (62), way 6 (64), and way 7 (66)) of equal size. Although this embodiment shows a cache with eight ways, it is to be appreciated that the cache may be implemented with more or less ways. Such an organizational structure of cache 50 (as shown in FIG. 3) may be implemented within the cache 13 of FIG. 1 and the L1 cache and/or L2 cache 22 of FIG. 2. Thus, the cache controller 15 (FIG. 1) has a choice of eight cache ways for storing data when it obtains information from main memory 15.

Every insertion into the cache has an associated age. For example, in one embodiment, age 0 is the most recently used element, age 4 is middle age, and age 7 is the oldest used element. In this embodiment, ages 0 through 7 corresponding to the eight ways in the cache 50. The mapping of ages to physical ways is performed using, for example, the well known LRU algorithm. However, the exact nature of mapping is irrelevant to the present invention. Moreover, in this embodiment, there are as many ages as there are ways in the cache 50, however, this is not a requirement.

FIG. 4 is a table illustrating an exemplary cache management technique in accordance with the principles of the present invention. In this exemplary cache management technique, a processor (e.g., CPU 10) runs two streams of execution, A and B, which in random order reference (or access) a set of six elements each. Alternatively, two processors each access a shared cache (e.g., cache 13 of FIG. 1). In this example, only the elements that are directed to the same set in the cache 50 are considered. This technique may be performed by all sets in the cache independently and in parallel. For simplicity, the access streams are the same and interleaved. Thus, the first stream of execution (A) accesses elements (A: 1 5 4 6 7 6 1 3 4 1) and the second stream of execution (B) accesses elements (B: 1 5 4 6 7 6 1 3 4 1). In this technique, it is further assumed that the first stream of execution (A) has priority over the second stream of execution (B). In another embodiment, the second stream of execution (B) may have priority over the first stream of execution (B). Moreover, priority may be (1) set by the processor, (2) part of the instruction (e.g., op code), (3) user visible and selectable by software, and (4) implemented in any number of other ways. Referring back to the technique of the present embodiment, the first stream of execution (A) may be performing a real-time task while the second stream of execution (B) may not. Accordingly, the first stream of execution (A) is inserted into cache at age 0 while the second stream of execution (B) is inserted into cache at age 4. Ages 0 through 3 are exclusively used by stream A and ages 4 through 7 are used by both stream A and stream B.

Referring to FIG. 4, at time 0 ("T0"), element one of stream A ("A1") accessed the cache which results in a cache miss. As a result, A1 is inserted into the cache at age 0. Ages 1 through 7 may contain data, but the data is not valid (i.e., "don't care"). At T1, B1 misses the cache so it is inserted at age 4. At T2, A5 misses the cache and is inserted at age 0, A1's age increases to age 1, and B1's age increases to 5. That is, all ages after the insertion age (in this case ages 1 through 7) are increased by one. However, in another embodiment, only successive ages after the insertion age, which have valid data, are increased in age by one. Thus, under this embodiment, A1's age would still be increased to age 1, but B1's age would not change.

Continuing to refer to FIG. 4, At T3, B5 misses the cache and is inserted at age 4, B1's age increases to age 6, and A5 and A1 remain at ages 0 and 1, respectively. At T5, B4 misses the cache and is inserted at age 4, which causes B5's age to increase to age 6 and B1 is evicted from the cache. At time T7, B6 misses the cache and is inserted at age 4, which causes B4's age to increase to 6 and B5 is evicted from the cache. At T8, A4 hits the cache at age 1, so its age changes to age 0 and A6's age, which was at age 0, increases to age 1. The other ages in the cache are not affected. Analogously, at time T9, B4 hits the cache at age 6, so its age changes to age 4 and B6's age, which was at age 4, increases to age 5.

After T14, the state of the cache from ages 0 through 7 is A1 A6 A7 A4 A5 B6 B7 B4. At T15, B1 misses the cache and is inserted at age 4 which causes ages 4 through 7 to increase by one in age. As such, B4, which was at age 7, is evicted from the cache. The state of the cache then becomes A1 A6 A7 A4 B1 A5 B6 B7. At T16, A3 misses the cache and is inserted at age 0, causing elements having ages 0 through 7 to increase in age by one. As such, B7, which was at age 7, is evicted from the cache. After completing all accesses, it can be seen that stream A had five hits, six misses, and one eviction and stream B had three hits, eight misses, and five evictions. In this embodiment, it is seen that stream A had better use of the cache.

It is to be appreciated that the present invention may be implemented with one or more streams of execution and that different streams of execution may be inserted into the cache at any age, as determined by several factors including, but not limited or restricted to, the number of streams of execution, the priority of the streams of execution, the size of the cache, the number of ways in the cache, and the like.

FIG. 5 is a table illustrating an second exemplary cache management technique in accordance with the principles of the present invention. In this exemplary technique, an eight ways cache is assumed with an access stream where some of the accesses are temporal (e.g., elements 1–6) and are inserted at age 0 and some of the elements are non-temporal (e.g., elements A–F) and are inserted at middle age (e.g., age 4). Thus, ages zero through three are used only by temporal accesses and ages four through seven are used by both temporal and non-temporal accesses. In this example, it is further assumed that the elements are directed to the same set and have the following access sequence: 1 2 6 A 2 5 B 3 C 4 D 6 E 2 4 F 5 4. However, this technique may be performed by all sets independently and in parallel.

Referring to FIG. 5, at time 0 ("T0"), element 1 misses the cache and is inserted at age 0. At T1, element 2 misses the cache and is inserted at age 0 causing element 1 to increase in age by one. At T3, element A misses the cache and is inserted at age 4 with elements 1 and 2 remaining unchanged. At T4, element 2 hits the cache and is moved to age 0 and element 6, which was at age 0, is moved to age 1. The other elements remain unchanged. At T5, element 5 misses the cache and is inserted at age 0 which causes elements 2, 6, 1, and A to be increased by one in age. At T6, element B misses the cache and is inserted at age 4 causing element A to increase in age by one to age 6. At T8, element C misses the cache and is inserted at age 4, causing the elements at ages 4 through 7 to be increased in age by one. As a result, element A, which was at age 7, is evicted from the cache. Moving down to T12, element E misses the cache and is inserted at age 4, causing the elements at ages 4 through 7 to be increased in age by one. As such, element 1 is evicted from the cache.

In another exemplary cache management technique, implemented in a single or multiple processor computer system, priority as to the insertion age of elements into a cache is dependent on the type or class of instruction. For example, data retrieved by prefetch instructions are given lower priority in the cache over data retrieved or stored by load or store instructions. Prefetch instructions retrieve and place data to a specified cache level (e.g., L1 cache, L2 cache, etc.) in anticipation of future use. In one embodiment, prefetch instructions may place data in the cache at a predetermined age. A feature common to all prefetch instructions is that the data fetched may never be used, depending on the processor implementation. Thus, elements that are brought in by specific classes of instructions, such as prefetch instructions, are inserted into the cache at, for example, middle age.

A second example includes insertion of instructions and data that are predicted to have a lower likelihood of completing, such as those executed after a predicted conditional branch, at middle age. A third example includes giving priority in the cache to temporal data over non-temporal data. That is, temporal data is inserted into the cache at an earlier age (e.g., age 0) than non-temporal data (e.g., middle age or later) since non-temporal data will only be used once or at most a limited number of times. A fourth example includes data and instructions where priority is given to one type over another. For example, in one embodiment, instructions that are used repeatedly are given priority over data. In such a case, instructions are inserted into the cache at an earlier age than data.

Variations to the techniques provided in accordance with the present invention may be implemented. A first variation involves a cache hit of a lower priority element (e.g., B2 of FIG. 4 or C or FIG. 5), where the age of the lower priority element that was hit is updated to middle age (or the insertion age of the lower priority accesses) rather than the earliest age. A second variation is that if a lower priority access inserts elements at middle age and there is a hit to that lower priority element, its age is changed to the insertion age of higher priority accesses (e.g., age 0, age 1, etc.). This will maintain the most reusable elements between ages 0 and middle age in the cache and avoid having such reusable elements "flushed" out of the cache by elements that are not as reusable.

By implementing the apparatus and method of the present invention, a shared cache structure for maintaining a reusable state in the cache leads to a more efficient use of the cache's resources thereby increasing performance. It must be appreciated that the techniques of the present invention not only apply to cache structures, but also, to any structure that exhibits cache-like behavior including, but not limited or restricted to, a translation lookaside buffer ("TLB"), a page mapping unit, a branch prediction unit, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A cache allocation method for a cache that includes a plurality of sets each having at least two ways, comprising:

receiving a first element in a first way of a set within the cache;

assigning a first age to the first element;

receiving a second element in a second way of the set within the cache; and assigning a second age to the second element, the second age being different than the first age.

2. The cache allocation method of claim 1 wherein receiving the first element comprises receiving the first element of a first stream in the first way of the set within the cache, and receiving the second element comprises receiving the second element of a second stream in the second way of the set within the cache.

3. The cache allocation method of claim 2 wherein elements of the first stream have priority over element of the second stream.

4. The cache allocation method of claim 1 wherein receiving the first element comprises receiving the first element of a first type in the first way of the set within the cache, and receiving the second element comprises receiving the second element of a second type in the second way of the set within the cache.

5. The cache allocation method of claim 4 wherein elements of the first type have priority over elements of the second type.

6. The cache allocation method of claim 5 wherein elements of the first type are temporal data and elements of the second type are non-temporal data.

7. The cache allocation method of claim 1 wherein elements of the second age are discarded from the cache before elements of the first age.

8. The cache allocation method of claim 1 further comprising:
receiving a third element in the second way of the set within the cache;
causing the second element to be discarded;
assigning the first age to the third element; and
assigning the second age to the first element.

9. The cache allocation method of claim 1 further comprising:
receiving a third element in one of the first and second ways within the cache;
causing one of the respective first and second elements to be discarded;
assigning the first age to the third element; and
assigning the second age to one of the respective first and second elements.

10. A cache allocation method for a cache that includes a plurality of sets, comprising the combined acts of:
receiving a first element in a set within the cache;
assigning a first age to the first element;
receiving a second element in the set within the cache; and
assigning a middle age to the second element where the middle age is a greater age than the first age.

11. The cache allocation method of claim 10 wherein receiving the first element comprises receiving the first element of a first stream in the set within the cache, and receiving the second element comprises receiving the second element of a second stream in the set within the cache.

12. The cache allocation method of claim 10 wherein elements of the first stream are placed in the cache at an earlier age than elements of the second stream.

13. The cache allocation method of claim 10 wherein receiving the first element comprises receiving the first element of a first type in the set within the cache, and receiving the second element comprises receiving the second element of a second type in thee set within the cache.

14. The cache allocation method of claim 13 wherein elements of the first type are placed in the cache at an earlier age than elements of the second type.

15. The cache allocation method of claim 14 wherein elements of the first type are temporal data and elements of the second type are non-temporal data.

16. The cache allocation method of claim 10 wherein elements of a higher age are discarded from the cache before elements of a lower age.

17. The cache allocation method of claim 10 further comprising:
receiving a third element in the set within the cache;
assigning the first age to the third element;
assigning a second age to the first element; and
increasing the age of the second element if the middle age is equal to the second age.

18. The cache allocation method of claim 17 further comprising:
receiving a fourth element in the set within the cache;
assigning the middle age to the fourth element;
increasing the age of the second element by one from the middle age.

19. The cache allocation method of claim 18 further comprising:
receiving a fifth element in the set within the cache;
assigning the middle age to the fifth element;
increasing the age of the fourth element by one from the middle age; and
discarding the second element from the cache.

20. A cache allocation method for a cache, comprising:
assigning a middle age, between a first age and a last age, to elements of a first type received in a set within the cache;
increasing the age of elements of the first type, if any, by one when an element of the first type is received in the set within the cache;
discarding an element of the first type from the cache if the element has a last age and an element of the first type is received in the set within the cache;
assigning the first age to elements of a second type received in the set within the cache;
increasing the age of elements of the second type, if any, by one when an element of the second type is received in the set within the cache; and
increasing the age of elements of the first type, if any, by one if there are a number of elements of the second type equal to the middle age minus the first age in the set when an element of the second type is received in the set within the cache.

* * * * *